United States Patent [19]

Beaumont

[11] Patent Number: 5,645,092
[45] Date of Patent: Jul. 8, 1997

[54] PROCESS AND INSTALLATION FOR CLEANING PARTIALLY DE-LEAFED LEAFY SALAD VEGETABLES AND REMOVING SMALL FOREIGN BODIES THEREFROM

[75] Inventor: Laurent Beaumont, Coutances, France

[73] Assignee: Soleco "Societe Legumiere Ducotentin", Lessay, France

[21] Appl. No.: 529,130

[22] Filed: Sep. 15, 1995

[30] Foreign Application Priority Data

Oct. 12, 1994 [FR] France ..................... 94 12173

[51] Int. Cl.$^6$ ..................................... B08B 3/02
[52] U.S. Cl. ............... 134/102.2; 134/25.3; 134/104.4; 134/130; 134/147; 134/182; 426/481; 209/172.5; 209/173; 209/273
[58] Field of Search ............... 209/172.5, 173, 209/273; 134/102.2, 104.4, 182, 130, 147, 25.3; 426/481

[56] References Cited

U.S. PATENT DOCUMENTS

| | | | |
|---|---|---|---|
| 952,734 | 3/1910 | Haller | 134/104.4 |
| 1,109,529 | 1/1914 | Jaffe | 209/73 |
| 1,209,900 | 12/1916 | Stebler | 209/73 |
| 1,311,496 | 6/1919 | Castellini | 134/130 |
| 1,312,098 | 11/1919 | Cerruti | 209/173 |
| 1,415,985 | 5/1922 | Buckley | 209/173 |
| 1,507,951 | 9/1924 | Bockley | 209/173 |
| 1,643,596 | 9/1927 | Zuckerman | 209/173 |
| 1,705,544 | 3/1929 | Schmidt | 134/104.4 |
| 2,013,522 | 9/1935 | Hills | 134/130 |
| 2,635,614 | 4/1953 | Ford | 134/130 |
| 2,813,074 | 11/1957 | Banks et al. | 210/44 |
| 3,259,373 | 7/1966 | Ranson | 134/182 |
| 3,567,017 | 3/1971 | Hughes | 209/173 |
| 3,822,015 | 7/1974 | Hseih et al. | 209/173 |
| 4,063,565 | 12/1977 | Edwards et al. | 134/104.4 |
| 4,223,688 | 9/1980 | Hylund et al. | 209/173 |
| 4,355,433 | 10/1982 | Dietrich | 15/302 |
| 5,413,131 | 5/1995 | Medlock | 134/104.4 |
| 5,522,941 | 6/1996 | Uchinami et al. | 134/102.2 |

FOREIGN PATENT DOCUMENTS

| | | |
|---|---|---|
| 0 117 589 | 9/1984 | European Pat. Off. . |
| 62-224238 | 10/1987 | Japan . |
| 2 095 102 | 9/1982 | United Kingdom . |

*Primary Examiner*—Jill Warden
*Assistant Examiner*—Sharidan Carrillo
*Attorney, Agent, or Firm*—Panitch Schwarze Jacobs & Nadel, P.C.

[57] ABSTRACT

An installation for cleaning pieces of partially deleafed leafy salad vegetables and for removing particles of small foreign bodies therefrom includes a bath for receiving the pieces to be cleaned and a means for causing the pieces to circulate in the bath. A deflector, which is permeable to the particles, deflects the pieces below the level of the bath. A source of gas bubbles emits gas bubbles below the deflector so that the gas bubbles entrain the particles and cause the particles to rise through the deflector to separate the particles from the pieces. A particle collector recovers and removes the particles which have risen through the deflector and are floating on the surface of the bath.

8 Claims, 4 Drawing Sheets

PROCESS AND INSTALLATION FOR CLEANING PARTIALLY DE-LEAFED LEAFY SALAD VEGETABLES AND REMOVING SMALL FOREIGN BODIES THEREFROM

FIELD OF THE INVENTION

The present invention relates to a process and an installation for cleaning partially de-leafed leafy salad vegetables, which are in piece-form, in order to remove small foreign bodies, such as small pieces of plants, earth, dirt or small insects, which remain attached to the pieces of partially de-leafed leafy salad vegetables already cleaned by being floated in a bath.

The development of partially de-leafed leafy salad vegetables, that is to say, leafy salad vegetables prepared and packaged in packets under an inert atmosphere, in a state practically ready to be seasoned, requires improvements in the preparation chain, especially in the cleaning of the partially de-leafed leafy salad vegetables. The prepared pieces of leafy salad vegetables are generally cleaned by being floated in a bath of salted water in order to cause the small animals, such as snails or the like which remain attached to the salad leaves, to fall to the bottom of the bath. This cleaning process is not, however, sufficient to eliminate the small, very light, foreign bodies which are not sensitive to this cleaning bath and can at present be removed only by hand. These foreign bodies are, for example, small animals, small spiders, ants, etc... or grains of sand or small pieces of straw or leafy salad vegetables which remain attached to the prepared pieces.

At present, the pieces of leafy salad vegetables are inspected visually and those on which such foreign bodies appear are cleaned. Unfortunately, in addition to their laborious and expensive nature, these checking and cleaning operations allow a large number of foreign bodies through so that, when the prepared leafy salad vegetables are used, a second meticulous cleaning operation has to be carried out.

SUMMARY OF THE INVENTION

The aim of the present invention is to overcome these disadvantages and to provide a cleaning process and installation enabling the small foreign bodies to be removed from the pieces of partially de-leafed leafy salad vegetables before those leafy salad vegetables are packaged for sale.

To that end, the invention relates to a process which is characterised in that:
the pieces are maintained below the level of the water;
a stream of gas bubbles is passed through them in order to entrain the particles and cause them to rise to the surface of the bath separately from the pieces;
the particles are removed.

The invention relates also to a cleaning installation, especially for implementing the process. This installation is characterised in that it comprises a bath receiving the pieces to be cleaned, a means for causing the pieces to circulate in the bath, a deflector, which is permeable to the particles, for deflecting the pieces below the level of the bath, and a source of gas bubbles emitting gas bubbles below the deflector so that they rise through the deflector and separate the particles attached to the pieces in order to entrain them.

The process and the installation enable the low density of the small foreign bodies to be used in order to subject the pieces to be cleaned to agitation and "sweeping" by the stream of liquid and gas bubbles below the level of the bath so that the particles are detached from the pieces and entrained in the ascending current formed by liquid and gas in order to separate them from the pieces and recover them at the surface of the bath.

This cleaning operation treats the partially de-leafed pieces of leafy salad vegetables gently because the entrainment of the pieces below the level of the bath is effected gently. The agitation by circulation of the bath (relative circulation), and the gas bubbles, in particular air or an inert gas, produce a very efficient agitation of the fluid on the surface of the pieces, possibly with turning and agitation of the pieces, with the result that the two faces of the pieces are exposed to this ascending stream entraining the small particles.

The deflector guiding the pieces below the level of the bath comprises passages or perforations which are of a size sufficient to allow the liquid/gas stream charged with particles to pass through while the pieces are retained. The deflector may thus be formed by a piece of perforated sheet metal or by a network of wires preferably directed in the direction of flow of the bath.

It may also be advantageous to direct these wires in the transverse direction in order to create areas of roughness to which the pieces become attached in such a manner as to promote their rolling or turning movement during their circulation below the level of the bath.

The function of the permeable deflector is not only to cause the pieces to descend below the level of the bath but also to separate the pieces from the particles which have been detached, in order to prevent the latter from reattaching themselves to the pieces.

Although the use of a simple deflector, that is to say, a static member, has surprisingly yielded excellent results, it is also possible to replace the deflector and the bath-circulating means by a single means formed, for example, by a rotating cylinder equipped with blades or a conveyor belt descending below the level of the bath or a disc with blades or cups entraining the pieces below the level of the bath, through the ascending stream of liquid and gas bubbles.

In the case of a stationary deflector, it is advantageous to cause the bath to circulate, especially in a closed circuit. This circulation may be effected by pumps.

According to an advantageous feature, the deflector is a surface in the form of a ramp descending below the level of the bath. This surface may be a flat surface or a curved surface.

In order to promote the effect of turning the pieces and the creation of shocks promoting the separation of the particles, the deflector may be produced by assembling a succession of ramps maintaining the pieces below the level of the bath but causing them to travel ascending and descending paths with breaks.

In the case of a single ramp or a plurality of ramps, it is advantageous to follow this (these) ramp(s) with a substantially horizontal surface, which is permeable to the particles, in order to cause the pieces which are to be cleaned to circulate below the surface of the bath over a certain distance which can also be controlled as a function of the speed of circulation of the bath, depending on the nature of the pieces to be cleaned. The removal of the particles, which become attached to the bubbles and float on the surface of the bath owing to their light weight or to surface-tension effects, is effected by a collecting element, for example a static collecting element, such as a chute, which uses the circulation of the liquid and evacuates the particles to the exterior of the bath. The collecting element may also be a conveyor belt or an equivalent means which skims the surface of the bath.

BRIEF DESCRIPTION OF THE DRAWINGS

The present invention will be described in more detail hereinafter with reference to the appended drawings, in which.

DESCRIPTION OF THE PREFERRED EMBODIMENTS

Figure 1:
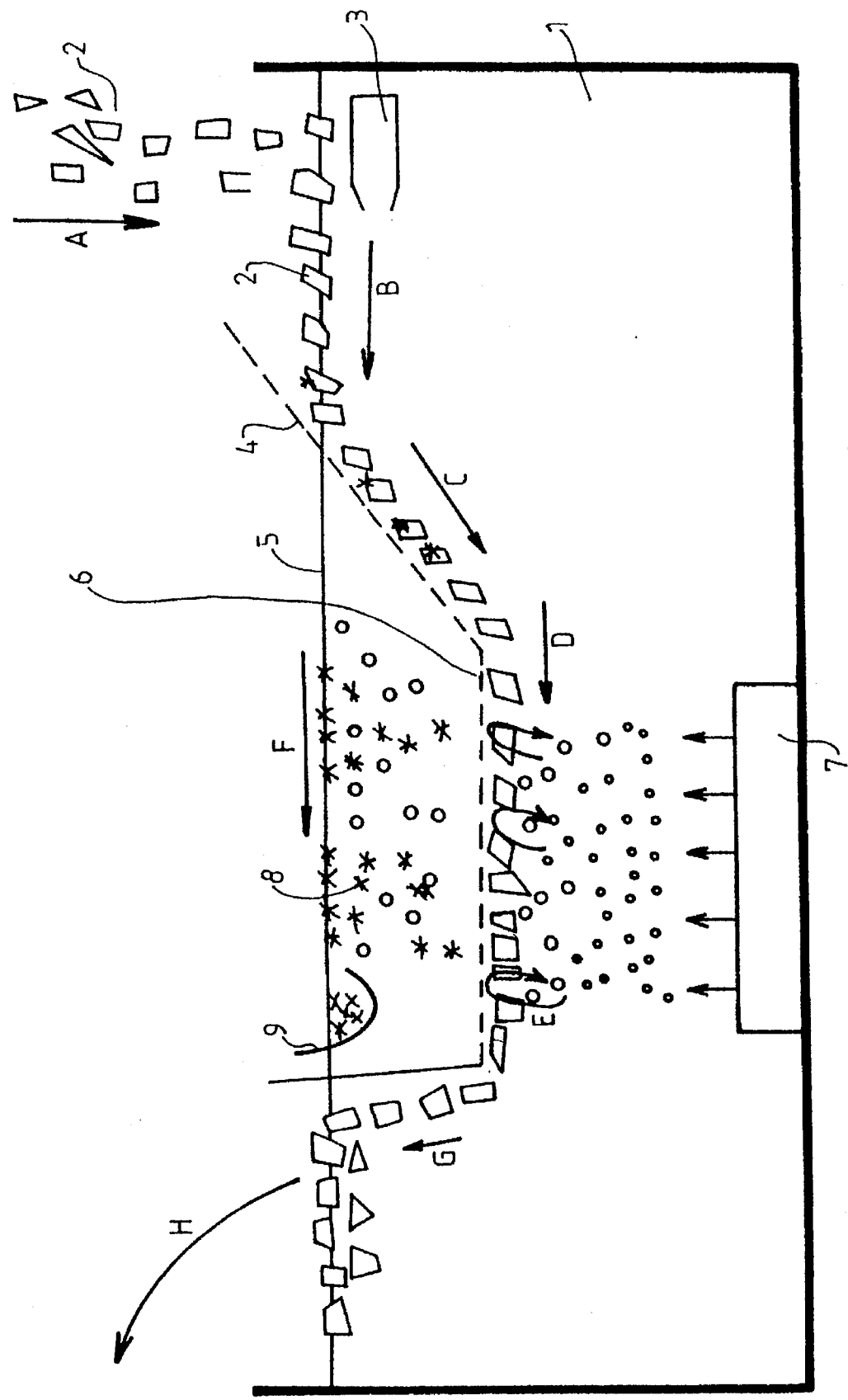
FIG. 1 is a diagrammatic view of an installation according to the invention.

According to FIGS. 1 and 2, the invention relates to a process and an installation for cleaning partially de-leafed leafy salad vegetables, referred to in the description hereinafter as "pieces", in order to remove the small foreign bodies which are referred to by convention as "particles". As already indicated, these foreign bodies may be plant pieces, mineral products, small stones, grains of sand, etc. . . . or small insects or small animals which have escaped previous cleaning operations for separating large foreign bodies (snails, slugs, larger plant pieces, stones, etc . . .).

According to the invention, a bath 1 is used in which the pieces 2 to be cleaned are immersed. The bath 1 is equipped with a means 3 for causing the liquid of the bath to circulate in the direction of arrow B.

This circulation means is formed, for example, by an injector fed by a pump.

The pieces 2 are thus entrained in the direction of arrow B and arrive at a deflector 4 which causes them to descend in the direction of arrow C below the level 5 of the bath. Usually, the pieces 2 float on the surface of the bath.

The deflector 4 is in this case extended by a horizontal portion 6 which passes over a source of gas bubbles 7 arranged at the base of the tank of the bath 1. The gas source 7 emits fine bubbles which rise through the bath while agitating the pieces 2 (arrow E), turning them and sweeping over all their faces.

The deflector 4 and, above all, the extension 6 of the deflector are equipped with perforations or meshes which are of a size sufficient to permit the passage of the foreign bodies, indicated by the asterisks 8, which are entrained by the stream of liquid/gas bubbles so that they are separated from the pieces 2 and arrive at the surface 5 of the bath, on the other side of the deflector 4 and its extension 6.

The pieces 2 continue their circulation and, at the end of the portion 6, the pieces 2 rise to the surface of the bath (arrow G) from where they are removed (arrow H).

The particles 8 are collected by means of a collector 9, for example in the form of a chute, which skims the surface 5 of the bath above the deflector 4 and its extension 6. The particles are removed from the bath either by liquid entrainment or by a mechanical means not shown in this Figure.

The bath 1 is generally water, optionally with an additive compatible with food regulations. The gas used to entrain the particles is generally air. It may also be nitrogen in the case of fragile products in order to avoid too rapid an oxidation.

Figure 2:
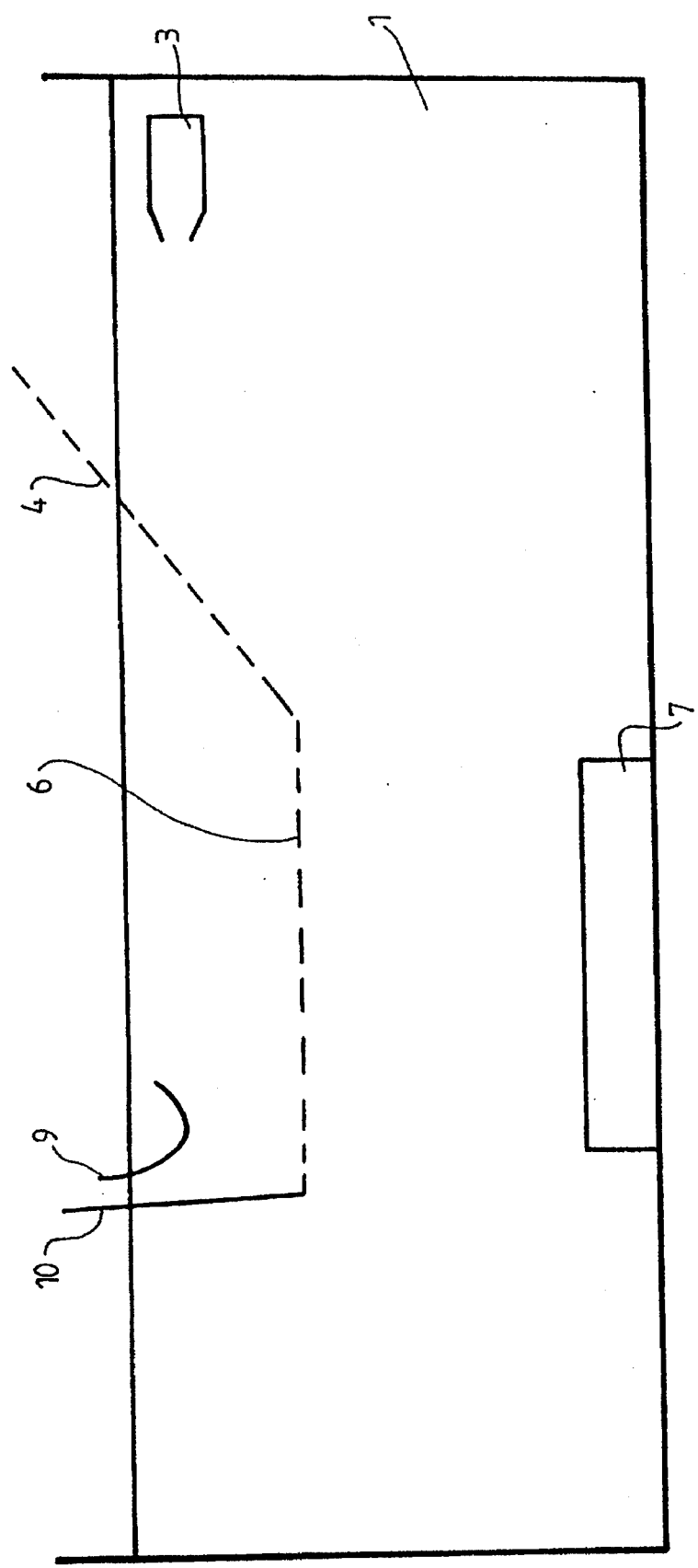
FIG. 2 is a diagrammatic view of the installation of FIG. 1 without the pieces to be cleaned.

FIG. 2 is a diagram of the structure of the installation described above with reference to FIG. 1. This Figure shows, in particular, the tank constituting the bath 1 and the means 3 for causing the liquid to circulate. This means is represented diagrammatically in the form of a nozzle, but without showing the connections to the pump and the pipes drawing the liquid, preferably on the side where the products are discharged, in order to create a circulation of liquid entraining the pieces.

The gas source 7 may be formed by a compressor (not shown) which supplies the source 7 formed by a box placed at the bottom of the bath. This box is provided with perforations and, optionally, registers in order to control the flow of gas and the size of the bubbles.

The deflector is composed of a principal portion 4, followed by an extension 6. In the case of FIGS. 1 and 2, the portions 4 and 6 are formed by two flat surfaces which adjoin one another. Other forms may, however, be envisaged, as will be seen later.

The deflector 4, 6 is generally formed by a piece of perforated sheet metal but it may also be a structure of stainless steel wires, the size of the apertures and meshes of which is selected in order to permit the passage of the particles to be removed.

Finally, FIG. 2 shows the particle-collector 9.

The extension 6 of the deflector 4 is preferably followed by a partition 10 which is usually at least permeable to the liquid of the bath in order to facilitate circulation. The only requirement is that the partition 10 should be of a permeability which does not permit the passage of the particles to be removed. However, the partition 9 may also be impermeable.

Figure 3:
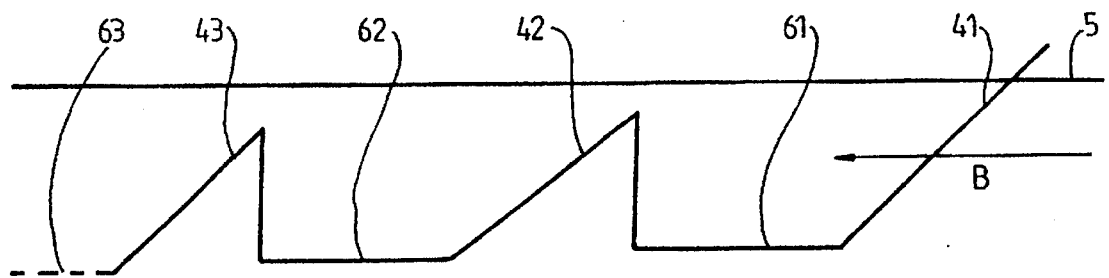
FIGS. 3, 4 and 5 are diagrams of three deflector profiles.

FIG. 3 shows a first variant of the deflector arranged relative to the level 5 of the bath, the liquid of which circulates in accordance with arrow B. The deflector is composed of an assembly of deflectors 41, 42, 43 in the form of an inclined plane, followed in each case by an extension 61, 62, 63. The ramps 41, 42, 43 and the extensions 61, 62, 63 are perforated or permeable to the particles.

Figure 4:
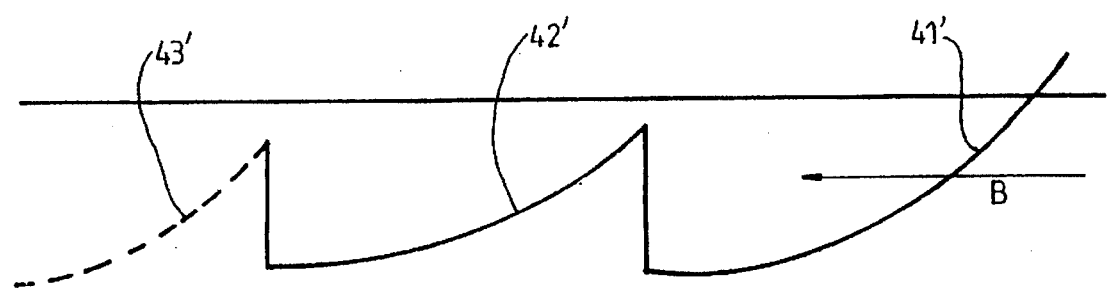
Figure 5:

FIG. 4 shows another variant of the deflectors which are likewise formed by assembling a succession of deflector elements 41', 42', 43'. . . , which are formed by a curved surface corresponding to the combination of the flat surfaces 4, 6 or 41, 61, etc . . .

These deflectors 41'–43' are also permeable to the small particles to be removed.

FIG. 4 shows another variant of a single deflector which may also be joined in an assembly in order to form a succession of deflectors. This single deflector 41' is a curved surface of which the curvature of the upstream side (arrow B) is very great, and diminishes progressively.

It should be noted that in the various Figures discussed above (FIGS. 1 to 5) the deflectors 4 . . . 41', 6 . . . 63 are formed by cylindrical elements of which only the cross-section has been shown.

It has been assumed that the bath 1 is subjected to a circulation of liquid and consequently to an entrainment of the particles from right to left.

It is also possible to provide circular installations with a bath in the form of a ring. The structures explained above then apply to one or more individual segments of the ring which are occupied transversely by deflectors.

This facilitates the circulation of the bath because the advance of the liquid takes place inside this ring shape.

Figure 6:
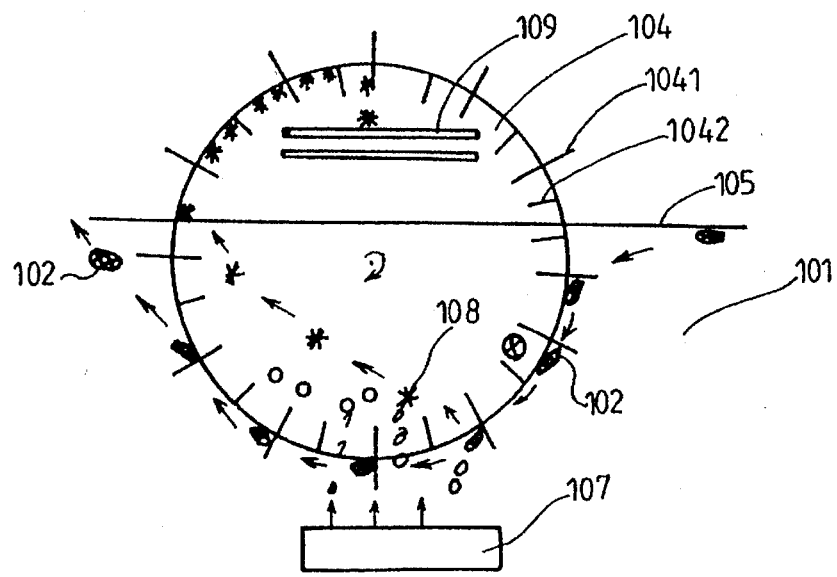
FIG. 6 is a diagram of a rotating cylinder equipped with blades for entraining the pieces to be cleaned.

FIG. 6 shows a variant of the means for entraining the pieces below the level of the liquid. This means is formed by a cylinder 104 which is partially immersed in the bath 101 below the level 105. The cylinder 104 is equipped with blades 1041 projecting towards the outside and towards the inside of the cylinder and also blades 1042 projecting only towards the inside of the cylinder. The cylinder is perforated in the same manner as the deflectors in order to permit the passage of the particles 108 which become separated from the pieces 102 entrained below the level of the bath by the blades 1041. The blades 1042 are used to skim the particles 108 from the surface of the bath, inside the cylinder 104, in order to lift them and drop them onto the removal means 109 which is formed, for example, by a conveyor belt.

The sense of rotation of the cylinder is indicated by the arrow i.

This installation comprises a source of gas bubbles 107 which is shown diagrammatically.

At the outlet, the pieces 102 rise to the surface, become separated from the cylinder 104 and are recovered as before.

Figure 7:
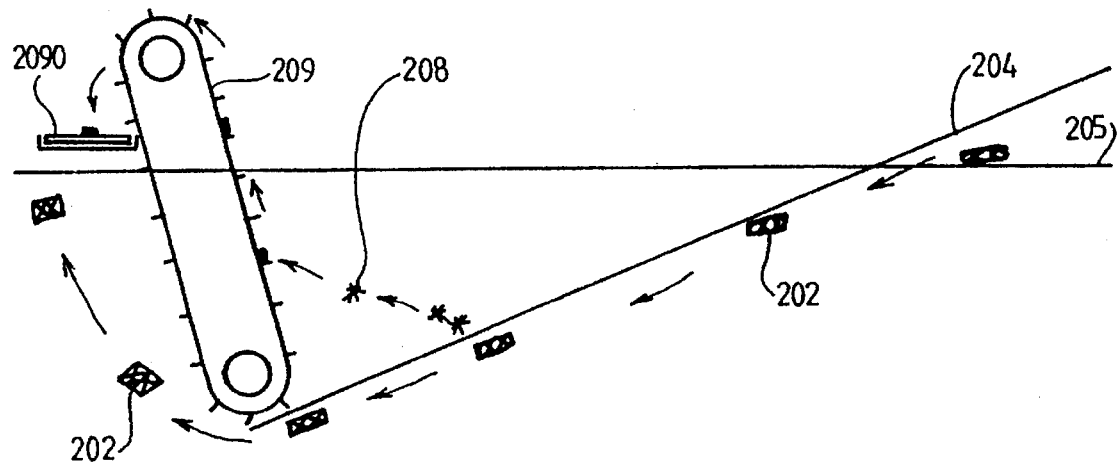
FIG. 7 is a diagram of a means for removing the particles separated from the pieces.

FIG. 7 shows another variant of the invention which provides for a deflector 204 descending below the level of the bath 205 in order to cause the pieces 202 to descend there. At the outlet of the deflector, a means 209 is provided for collecting the particles 208. This means 209 is a type of conveyor belt equipped with scrapers or bars for skimming the surface 205 of the bath and entraining the particles 208. The particles 208 fall from the other side of the belt 209 onto a belt 2090 which removes them.

To the left of the belt 209, the pieces 202 rise to the surface and are removed as before.

The present invention has been described above in its preferred application of cleaning pieces of partially de-leafed leafy salad vegetables in an industrial manufacturing chain before packaging. However, the process and the installation may also be used for cleaning other products, whether or not they are foodstuffs, which are in the same physical state and pieces of flat products which have a very irregular shape and to which particles to be removed are attached.

I claim:

1. An installation for cleaning pieces of partially de-leafed leafy salad vegetables and for removing particles of foreign bodies therefrom, said installations comprising:

A—a bath (1) for receiving the pieces to be cleaned (2);

B—means (3) for causing the pieces to circulate in the bath (1);

C—a deflector (4,6), having a first surface positioned below a surface level of the bath (1), said deflector maintaining the pieces of partially deleafed leafy salad vegetables (2) below said first surface, wherein said deflector is selectively permeable to said particles (8) and impermeable to said pieces;

D—a source of gas bubbles (7) emitting gas bubbles below the deflector (4, 6) so that the gas bubbles entrain the particles and cause the particles to permeate through the deflector to thereby separate the particles (8) from the pieces; and E—a particle collector (9) for recovering and removing the particles (8) which have permeated through the deflector and are floating on the surface level of the bath (1).

2. The installation according to claim 1, in which the means for causing the pieces (2) to circulate in the bath (1) comprises an injector means.

3. The installation according to claim 1, in which the means for causing the pieces (2) to circulate in the bath (1) is selected from the group consisting of:

a rotating cylinder (104) equipped with blades (1041, 1042);

a conveyor belt equipped with blades; and a disc having blades or cups.

4. The installation according to claim 1, in which said first surface is in the form of a ramp descending below the level (5) of the bath.

5. The installation according to claim 1, in which said first surface is in the form of a ramp (4) followed by a substantially horizontal extension (6) for maintaining the pieces to be cleaned (2) below the level of the bath.

6. The installation according to claim 4, in which said first surface is selected from the group consisting of an inclined flat surface (4, 41, 42, 43) and an inclined curved surface (41'42'43→).

7. The installation according to claim in which the deflector is formed by a succession of ramps (41–43, 41'–43').

8. The installation according to claim 1, in which the particle collector (8, 208) is selected from the group consisting of a chute (9) and a conveyor belt (209).

* * * * *